United States Patent
Simonis et al.

(10) Patent No.: US 7,878,813 B2
(45) Date of Patent: Feb. 1, 2011

(54) CONNECTION APPARATUS FOR TRANSMITTING ELECTRIC CURRENT, IN PARTICULAR FOR A STEERING WHEEL HEATER OF A VEHICLE

(75) Inventors: Karl Simonis, Illingen (DE); Rainer Lipfert, Heilbronn (DE); Martin Hasch, Schwieberdingen (DE); Roland Gruener, Tamm (DE); Bernd Binder, Sersheim (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 154 days.

(21) Appl. No.: 12/224,995

(22) PCT Filed: Mar. 7, 2007

(86) PCT No.: PCT/EP2007/001928

§ 371 (c)(1),
(2), (4) Date: Sep. 11, 2008

(87) PCT Pub. No.: WO2007/104450

PCT Pub. Date: Sep. 20, 2007

(65) Prior Publication Data

US 2009/0142937 A1    Jun. 4, 2009

(30) Foreign Application Priority Data

Mar. 14, 2006    (DE)    ........................ 10 2006 013 434

(51) Int. Cl.
H01R 39/00    (2006.01)
(52) U.S. Cl. .......................................... 439/15; 439/164
(58) Field of Classification Search ................... 439/15, 439/13, 164
See application file for complete search history.

(56) References Cited

U.S. PATENT DOCUMENTS

| | | | |
|---|---|---|---|
| 5,770,818 A | | 6/1998 | Tanaka et al. |
| 6,462,290 B1 * | | 10/2002 | Matsumoto ............... 200/61.54 |
| 6,494,396 B2 * | | 12/2002 | Sugata ...................... 242/388.5 |
| 6,764,326 B2 * | | 7/2004 | Matsumoto et al. .......... 439/164 |
| 6,854,977 B2 * | | 2/2005 | DuRocher et al. ............. 439/15 |
| 6,962,497 B2 * | | 11/2005 | Wade et al. ................... 439/15 |
| 7,445,451 B2 * | | 11/2008 | Tanaka et al. ................. 439/15 |
| 2001/0004560 A1 * | | 6/2001 | Oota et al. ................... 439/164 |

FOREIGN PATENT DOCUMENTS

| | | |
|---|---|---|
| DE | 195 33 439 | 2/1997 |
| DE | 197 36 012 | 2/1998 |
| DE | 199 20 995 | 4/2002 |
| DE | 600 15 444 | 10/2005 |

\* cited by examiner

*Primary Examiner*—Hien Vu
(74) *Attorney, Agent, or Firm*—Paul Vincent

(57) ABSTRACT

The invention relates to a connection device for transmitting electric current, in particular for a steering wheel heater of a motor vehicle, between a stationary housing part and a rotor which can rotate with respect to the housing part, comprising a flat ribbon cable and end plug connectors which are provided in the region of the free ends of the flat ribbon cable. The invention is characterized in that the flat ribbon cable has a central plug connector which is placed between the end plug connectors and is intended to be arranged on the rotor side or housing side, from which central plug connector at least one line runs to one end plug connector and one line to the other end plug connector, wherein the two end plug connectors are intended to be arranged on the housing side or rotor side. The invention also relates to a steering column/steering wheel transmission unit with a connection apparatus of this type.

13 Claims, 2 Drawing Sheets

CONNECTION APPARATUS FOR TRANSMITTING ELECTRIC CURRENT, IN PARTICULAR FOR A STEERING WHEEL HEATER OF A VEHICLE

This application is the national stage of PCT/EP2007/001928 filed on Mar. 7, 2007 and claims Paris convention priority of DE 10 2006 013 434.6 filed Mar. 14, 2006.

BACKGROUND OF THE INVENTION

The invention relates to a connection device for transmitting electric current between a stationary housing part and a rotor which can rotate with respect to the housing part, comprising a flat ribbon cable and end plug connectors which are provided in the region of the free ends of the flat ribbon cable, in particular for a steering wheel heater of a motor vehicle.

The invention also relates to a steering column/steering wheel transmission unit with a connection apparatus of this type.

DE 195 33 439 C1 has disclosed a connection apparatus for the transmission of current and/or light between two terminals. The connection apparatus comprises a first stationary housing part and a second housing part which is rotatable by a limited number of revolutions with respect thereto. A flat ribbon cable extends in windings and is arranged within the housing. The ends of the at least one flat ribbon cable are connected to the first housing part and the other ends of the flat ribbon cable to the second housing part. Such connection apparatuses are intended, for example, for transmitting current in motor vehicles between the rotatable steering wheel and a stationary housing part, in particular, a steering column switch module. The lines of the connection apparatus can be, for example, used to connect an airbag system or a control on the steering wheel side for an audio and navigation system.

If current is to be transmitted between the stationary housing part and the rotor for a steering wheel heater, lines with correspondingly large cross-sections are required due to the comparatively large quantities of current to be transmitted. Since ordinary flat ribbon cables cannot transmit such large quantities of current, one has attempted to provide two flat ribbon cables, running parallel, for transmitting the current, one for the current supply and one for the current return. The provision of several parallel flat ribbon cables for transmitting the current for a steering wheel heater is comparatively complicated and requires a relatively large number of components.

The task of this invention is therefore to propose a connection apparatus as specified above with which it is possible to transmit comparatively large quantities of current, which moreover has a comparatively compact design, and which requires only a small number of components.

SUMMARY OF THE INVENTION

This task is solved by a connection apparatus of the kind mentioned above in that the flat ribbon cable has a central plug connector which is placed between the end plug connectors and is intended to be arranged on the rotor side or housing side. At least one line runs from the central plug connector to one end plug connector and one line to the other end plug connector, wherein the two end plug connectors are intended to be arranged on the housing side or rotor side.

It is thus advantageously achieved that only one flat ribbon cable, with a central plug connector and corresponding end plug connectors connected to the central plug connector, can be used to transmit a comparatively large quantity of current.

It is thereby possible to provide two lines, independent of each other, using just one flat ribbon cable, i.e. one respective line from the central plug connector to each of the two end plug connectors.

In an advantageous embodiment of the invention, the central plug connector extends by a length x in the longitudinal direction of the flat ribbon cable, wherein a distance a from the central plug connector to one end plug connector substantially corresponds to a distance b from the central plug connector to the other end plug connector plus the length x. This results in the following: $a=b+x$. This embodiment has the advantage that the two flat ribbon cable sections between the central plug connector and the respective end plug connectors can be arranged in a mounting position running largely parallel to each other. The central plug connector then extends substantially in the direction of the shorter flat ribbon cable section. The individual plug connectors then advantageously run substantially in the longitudinal direction of the flat ribbon cable. In the installed state, the flat ribbon cable can then be bent through 180° on the central plug connector side facing the longer flat ribbon cable section, in the area directly adjacent to the central plug connector.

In such an embodiment, the two end plug connectors, or rather the sides of the two end plug connectors which face each other, can be advantageously fixed to each other. In particular, it is conceivable that the two end plug connectors can be latched in either a separable or inseparable fashion.

Advantageously, the central plug connector can provide two contact points, each of the contact points being electrically connected with at least one line running in the longitudinal direction of the flat ribbon cable, and at least one individual contact point being provided for each line at both end plug connectors. The provision of these substantially two lines running parallel to each other and extending in the longitudinal direction along the entire length of the flat ribbon cable has the advantage that a sufficient quantity of current can be transmitted between the central plug connector and the end plug connectors. Moreover, a suitable and advantageous lamination of the lines in the flat ribbon cable is possible. If two lines are provided which are arranged spaced apart from each other in the middle area, the upper and lower side of the insulation of the flat ribbon cable can be fixed to each other in this middle area.

In a further embodiment of the invention, the contact points on the central plug connector side can be designed as connector strands extending transversely to the longitudinal direction of the flat ribbon cable. In particular, such connector strands protrude from the outer edge of the flat ribbon cable in the same direction so that they can be contacted transversely to the longitudinal direction of the flat ribbon cable. These connector strands are advantageously arranged on the rotor side so that they can be contacted parallel to the rotation axis of the rotor via a mating connector element on the steering wheel side.

In a further advantageous embodiment of the invention, the contact points on the end plug connector side are designed as connector strands extending in the longitudinal direction of the flat ribbon cable. These connector strands can advantageously be contacted in the direction of the flat ribbon cable with stationary mating contacts on the housing part side. Mating contacts are, in particular, provided as mating connectors on the housing part for holding the connector strands.

The above-mentioned task is also solved by a steering column/steering wheel transmission unit with a stationary housing part on the steering column side and a rotor on the steering wheel side, which can rotate with respect to the housing part, comprising a connection apparatus according to the invention.

The rotor of such a transmission unit can, in particular, have a pocket-like holder for the central plug connector. This is to ensure a position-precise and permanently secure arrangement of the central plug connector on the rotor.

The pocket-like holder is then advantageously only slightly larger than the central plug connector. It is, in particular, conceivable that the central plug connector can be latched in the holder via a corresponding latching means, in particular in a separable manner.

The holder can be arranged substantially tangentially to the rotor axis of the rotor. A tangential outlet of the flat ribbon cable section adjoining the central plug connector is thereby ensured.

The holder can be open on at least one side in the axial direction with respect to the rotor axis for inserting the central plug connector. In such an embodiment, the side turned away from the open side, provided in the axial direction, is advantageously closed. Similarly, the sides of the holder provided in the radial direction can be closed.

For leading the two flat ribbon cable sections running between the central plug connector and the two end plug connectors out of the holder, it is advantageously provided that the holder is open on only one side in the tangential direction with respect to the rotor axis. As already described, both flat ribbon cable sections advantageously run in the same direction in the installed state of the connection apparatus.

According to the invention, the rotor may also comprise a rotor base part and a rotor cover part, wherein the holder is arranged in the rotor base part. When the central plug connector is installed in the rotor base part, this can advantageously be covered with the rotor cover part. In particular, the rotor cover part can advantageously provide connector-sleeve-like recesses which hold the connector strands on the central plug connector side or protectively surround them.

Further details and advantageous design variants of the invention can be taken from the following description which describes and explains, in detail, the embodiment of the invention shown in the figures.

DESCRIPTION OF THE PREFERRED EMBODIMENT

Figure 1:
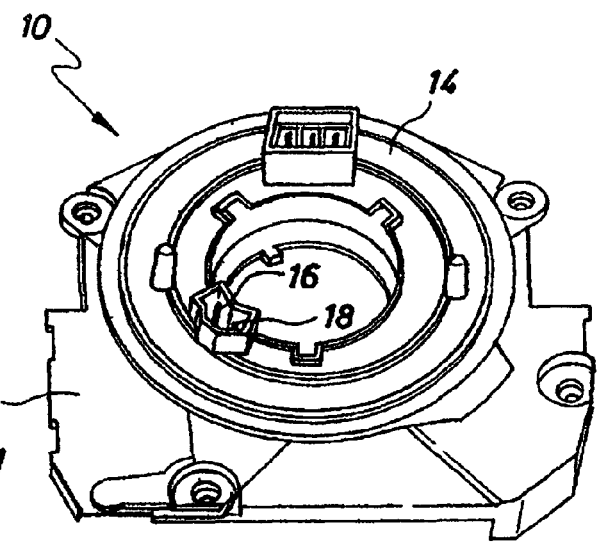
FIG. 1 shows a steering column/steering wheel transmission unit according to the invention with a housing part on the steering column side and with a rotor.

FIG. 1 shows a steering column/steering wheel transmission unit 10 according to the invention, comprising a stationary housing part 12 on the steering column side and a rotor 14 arranged rotatable with respect to the housing part 12. The rotor 14 provides two contact points 16, 18 in the form of connector strands extending parallel to the center-line of the rotor. These contact points 16, 18 serve for connection to the lines on the rotor side supplying an electrical steering wheel heater. The steering wheel heater as such can be formed by electrical resistances which generate heat when supplied with current.

Figure 2:
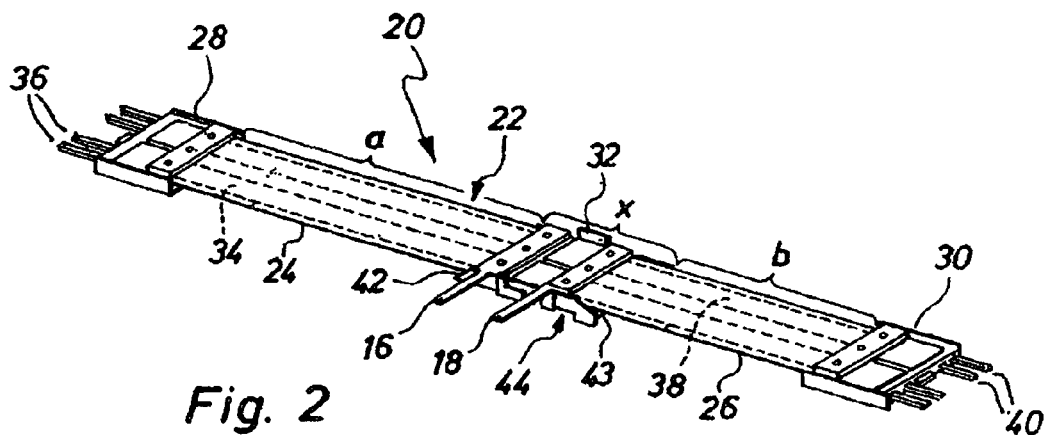
FIG. 2 shows a connection apparatus according to the invention in the extended state.

FIG. 2 shows a connection apparatus according to the invention for transmitting current for the steering wheel heater between the housing part 12 and the rotor 14. The apparatus 20 comprises a flat ribbon cable 22 which has two cable sections 24 and 26. One end plug connector 28, is arranged at each of the free ends of the flat ribbon cable 22. A central plug connector 32 is arranged between the end plug connectors 28, 30 or rather between the cable sections 24, 26. The central plug connector 32 comprises the contact points 16, 18 shown in FIG. 1.

Figure 2A:
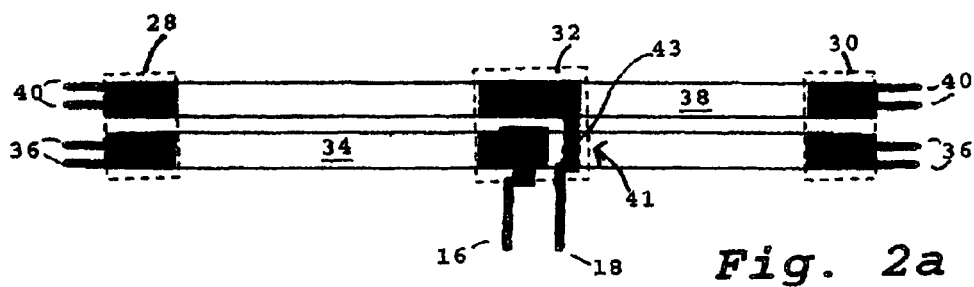
FIG. 2a shows the lines of the plug connectors of the connection apparatus according to FIG. 2.

As shown especially in FIG. 2a, the flat ribbon cable has two lines 34 and 38 running parallel, each extending along the entire length of the flat ribbon cable from the one end plug connector 28 to the other end plug connector 30. Line 34 ends in the two end plug connectors 28, 30, in the respective contact points 36; line 38 ends in the end plug connectors 28, 30, in two respective contact points 40. On the central plug connector side, line 34 is electrically connected with contact point 16 and line 38 with contact point 18. In the area 41, the line section 43 on the central plug connector side leading to the contact point 18 is electrically insulated with respect to line 34.

When the steering wheel heater is in operation, the current coming from the contact points 40 on the end plug connector side can, for example, be led to the contact point 18 on the central plug connector side. The contact point 18 then serves as the supply line for the steering wheel heater on the steering wheel side. The electrical current flowing through the steering wheel heater is then fed to the contact points 36 on the end plug connector side via the contact point 16 on the central plug connector side.

Comparatively high current flows are required for supplying steering wheel heaters with electrical current. Towards this end, it is necessary to dimension the supply line and discharge line accordingly. Therefore, according to FIG. 2 and FIG. 2a, of the four contact points 40, the two segments of the line 38 between the end plug connectors 28, 30 and the central plug connector 32 lead to the contact point 18 on the central plug connector side. A contact point 16, two segments of the line 34, and four contact points 36 are correspondingly provided for the return current.

The contact points 36, 40 can be welded or soldered to the respective associated lines 34, 38. Similarly, the contact points 16, 18 can also be welded or soldered with the respective associated lines 34, 38.

The provision of two lines 34, 38 running parallel has the advantage that these can be laminated by the insulating material of the flat ribbon cable sections 24, 26, also in the area between the parallel lines 34, 38. This results in an advantageous arrangement of the lines 34, 38 within the respective insulation of the flat ribbon cable sections 24, 26.

Figure 3:
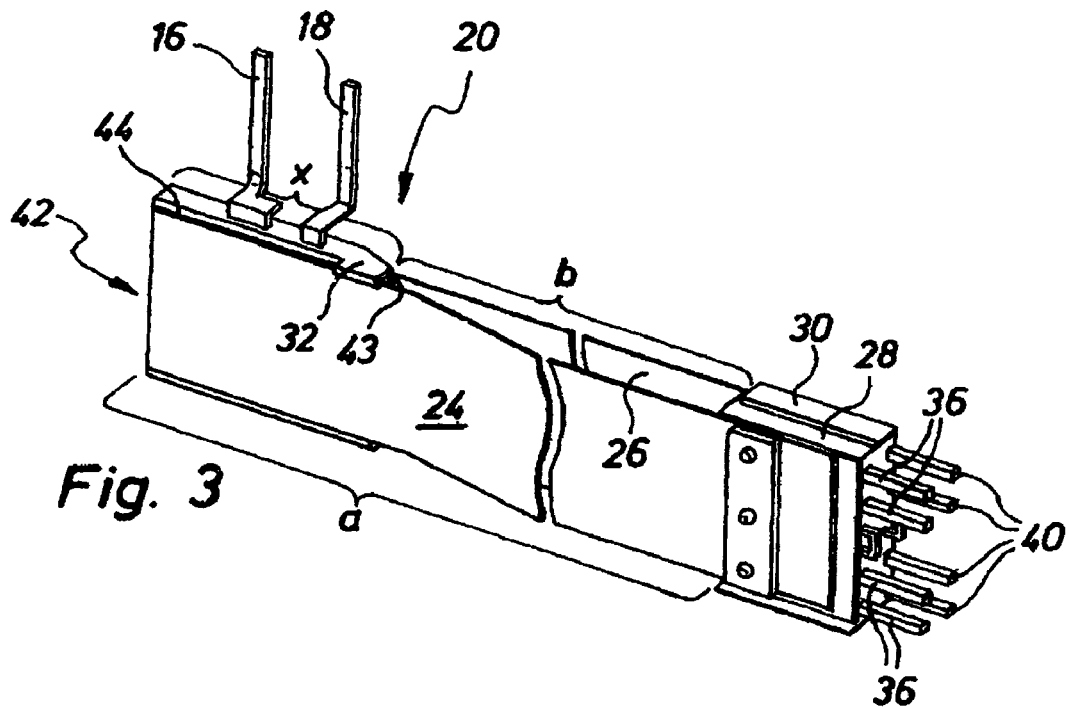
FIG. 3 shows the connection apparatus according to FIG. 2 in which the individual flat ribbon cable sections run parallel to each other.

As clearly shown in FIGS. 2 and 3, the central plug connector 32 extends in the longitudinal direction by an amount x. The distance from the central plug connector to the end plug connector 30 has the length b and the distance from the central plug connector 32 to the end plug connector 28 has the length a. The following substantially applies: a=b+x. This leads to the advantageous arrangement of the connection apparatus 20 shown in FIG. 3. The longer cable section 24 can be bent perpendicular to its longitudinal extension through 180° directly on the adjacent side 42 of the central plug connector 32 and run along the thereby adjacent upper side 44 of the central plug connector 32. Towards this end, the central plug connector can provide an edge on its side 42 facing the cable section 24, running transversely to the longitudinal direction of the flat ribbon cable, the longitudinal section of this edge being, at least in parts, round or bent, and around which the cable section 24 is bent through 180°. The provision of a corresponding rounding of the edge on which the cable section 24 abuts can prevent damage to the flat ribbon cable when bending the cable section 24. Bending in the described manner results in a substantially similar distance b of the two end plug connectors 28, 30 from the narrow side 43 of the central plug connector 32, as clearly shown in FIG. 3.

The two flat sides of the two end plug connectors 28, 30 facing each other in FIG. 3 can be designed in such a way that they can be fixed to each other, in particular latched to each other. This finally results in just one end plug connector unit, consisting of the two end plug connectors 28, 30 which can be electrically connected with mating connector elements in the housing part 12.

Figure 4:
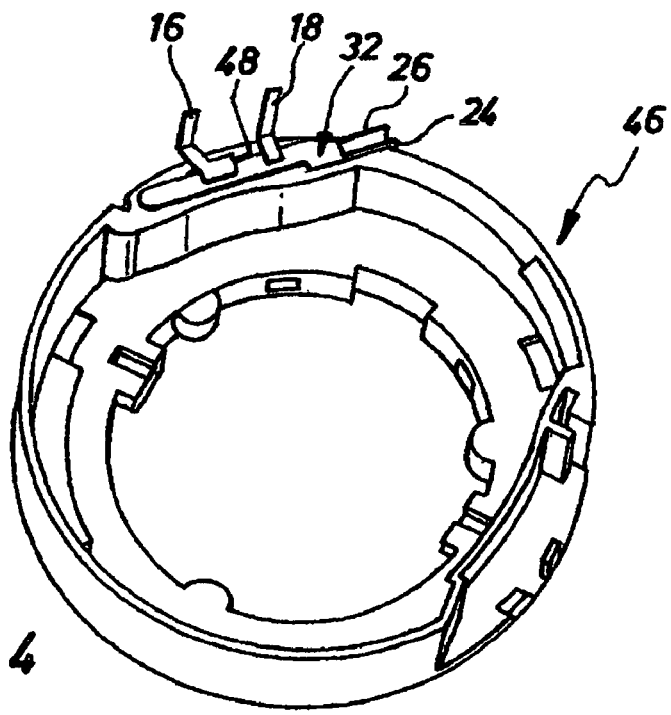
FIG. 4 shows an individual view of the rotor base part of the rotor according to FIG. 1.

The rotor 14 shown in FIG. 1 comprises a rotor cover part shown in FIG. 1 and a rotor base part 46 covered by the rotor cover part and shown in FIG. 4 as a separate part. The rotor base part 46 has a pocket-like holder 48 for the central plug connector 32. The holder 48 encloses the central plug connector 32 on its opposing flat sides and on the bottom side turned away from the contact points 16, 18. The holder 48 is open at the top in the axial direction with respect to the rotor axis so that the central plug connector can be inserted into the holder 48 from the axial top, with the cable section 34 bent around it as shown in FIG. 3. The holder 48 is open on one side in the tangential direction with respect to the rotor axis, for leading through the two cable sections 24, 28.

A secure and permanent arrangement of the central plug connector on the rotor is thereby ensured when rotating the rotor 14 or the rotor base part 46 with respect to the base housing. The central plug connector 32 can also provide fixing material, e.g. in the form of latching connections, with which it can be fixed to the rotor or the rotor base part 46.

The two cable sections 24, 26 are shown in a shortened version in FIGS. 2 and 3. In the installed state, the two cable sections 24, 26 running parallel to each other can either travel spirally around the rotor axis or be arranged with one or several windings between the rotor 14 and the housing part 12. The arrangement has to be such that the rotor is rotatable by a limited amount with respect to the housing part 12 in both rotational directions.

The contact points 36 and 40 on the end plug connector side are inserted in mating connector holders on the housing side for their contacting (not shown in the figures).

We claim:

1. A connection device, the connection device structured for transmitting electric current between a stationary housing part and a rotor, the rotor structured for rotation with respect to the housing part, the device comprising:
    a flat ribbon cable having a first ribbon cable section with a first free end and a second ribbon cable section with a second free end;
    a first end plug connector disposed at said first free end of said ribbon cable;
    a second end connector disposed at said second free end of said ribbon cable, wherein said first and said second end plug connectors are structured to be disposed on a housing side or on a rotor side;
    a central plug connector disposed between said first ribbon cable section and said second ribbon cable section, said central plug connector structured to be disposed on the rotor side or the housing side, wherein said first ribbon cable section electrically connects said central plug connector to said first end plug connector and said second ribbon cable section electrically connects said central plug connector to said second end plug connector.

2. The connection device of claim 1, wherein said central plug connector extends by an amount x in a longitudinal direction of said flat ribbon cable and a first distance from said central plug connector to said first end plug connector substantially corresponds to a second distance from said central plug connector to said second end plug connector plus said length x.

3. The connection device of claim 1, wherein said first and said second end plug connectors are fixed to each other.

4. The connection device of claim 1, wherein each of said first and said second ribbon cable sections has a first conductor line and a second conductor line, said central plug connector having a first contact point connected to said first conductor line and a second contact point connected to said second conductor line and said first end plug connector has a third contact point connected to said first conductor line and a fourth contact point connected to said second conductor line, wherein second end plug connector has a fifth contact point connected to said first conductor line and a sixth contact point connected to said conductor second line.

5. The connection device of claim 4, wherein said first and said second contact points on said central plug connector are designed as connector strands extending transversely to a longitudinal direction of said flat ribbon cable.

6. The connection device of claim 4, wherein said third, fourth, fifth and sixth contact points are designed as connector strands extending in a longitudinal direction of said flat ribbon cable.

7. A steering column/steering wheel transmission unit having a stationary housing part on a steering column side and a rotor on a steering wheel side, which can rotate with respect to said housing part, the unit comprising the connection device of claim 1 for transmitting an electric current between said housing part and said rotor.

8. The transmission unit of claim 7, wherein said electric current supplies a steering wheel heater.

9. The steering column/steering wheel transmission unit of claim 7, wherein the rotor has a pocket-like holder for said central plug connector.

10. The steering column/steering wheel transmission unit of claim 9, wherein said holder is arranged in said rotor substantially tangentially to a rotor axis.

11. The steering column/steering wheel transmission unit of claim 9, wherein said holder is open on at least one side in an axial direction with respect to a rotor axis for inserting said central plug connector.

12. The steering column/steering wheel transmission unit of claim 9, wherein said holder is open on at least one side in a tangential direction with respect to a rotor axis, for feeding through a first flat ribbon cable section running between said central plug connector and said first end plug connector and for feeding through a second flat ribbon cable section running between said central plug connector and said second end plug connector.

13. The steering column/steering wheel transmission unit of claim 9, wherein said rotor comprises a rotor base part and a rotor cover part, wherein said holder is disposed in said rotor base part.

* * * * *